(12) United States Patent
Heidari et al.

(10) Patent No.: US 6,718,019 B1
(45) Date of Patent: *Apr. 6, 2004

(54) METHOD AND APPARATUS FOR WIRELINE CHARACTERIZATION

(75) Inventors: Sam Heidari, Menlo Park, CA (US); Behrooz Rezvani, San Ramon, CA (US); Hojat Khelghati, San Jose, CA (US); Yuwen Su, Cupertino, CA (US); Qasem Aldrubi, Fremont, CA (US)

(73) Assignee: Ikanos Communications, Inc., Fremont, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 09/955,616

(22) Filed: Sep. 18, 2001

Related U.S. Application Data

(63) Continuation-in-part of application No. 09/876,195, filed on Jun. 6, 2001, now Pat. No. 6,516,049.
(60) Provisional application No. 60/261,715, filed on Jan. 13, 2001, and provisional application No. 60/209,943, filed on Jun. 6, 2000.

(51) Int. Cl.$^7$ .......................... H04M 11/00; H04M 1/00
(52) U.S. Cl. ................ 379/93.05; 379/22.02; 379/1.01; 379/400
(58) Field of Search ........... 379/1.01, 1.03–1.04, 379/22, 22.02, 22.04, 24, 30–31, 93.05–93.07, 93.09, 398, 399.01, 399.02, 400, 392–392.01, 93.31–93.32, 340; 375/222, 227, 254, 296; 333/136, 22 R, 32–33, 245, 263

(56) References Cited

U.S. PATENT DOCUMENTS

| | | | |
|---|---|---|---|
| 6,058,162 A | 5/2000 | Nelson et al. ........... 379/22.04 |
| 6,115,466 A | 9/2000 | Bella ..................... 379/399.01 |
| 6,137,880 A | 10/2000 | Bella ..................... 379/399.01 |
| 6,144,735 A | * 11/2000 | Bella ..................... 379/399.01 |
| 6,177,801 B1 | 1/2001 | Chong ..................... 324/520 |
| 6,205,220 B1 | 3/2001 | Jacobsen et al. ........... 379/417 |
| 6,263,048 B1 | 7/2001 | Nelson et al. ........... 379/27.03 |
| 6,417,672 B1 | 7/2002 | Chong ..................... 324/520 |
| 6,466,656 B1 | * 10/2002 | Evans et al. ............. 379/93.07 |
| 6,516,049 B1 | * 2/2003 | Heidari et al. ............ 379/1.01 |
| 6,563,864 B1 | * 5/2003 | Ibrahim et al. ............ 375/222 |

FOREIGN PATENT DOCUMENTS

EP 252872 A2 * 1/1988 ............ H04M/3/00

* cited by examiner

*Primary Examiner*—George Eng
(74) *Attorney, Agent, or Firm*—IP Creators; Charles C. Cary

(57) ABSTRACT

The current invention provides a method and apparatus for wireline characterization is disclosed. The method may be implemented with any modulation protocol but is particularly suited for multi-carrier modulation protocols such as discrete multi-tone (DMT). The apparatus may be incorporated into physical or logical modems. In an embodiment of the invention an apparatus for wireline characterization in a modem with a transmit path and a receive path each configured to couple with a remote modem via a wireline in which available communication bandwidth is split into a number of independent sub-channels is disclosed. The apparatus comprises: a tone selector, a cumulative loss estimator and a shift register. The tone selector selects a subset of the number of sub-channels within the bandwidth of a received wireline communication for which subset the sum of the square roots of the corresponding sub-channel indices may be expressed as an integer power "n" of 2. The cumulative loss estimator cumulates the insertion losses across the selected subset of the sub-channels and outputs a binary value corresponding thereto. The shift register couples to the cumulative loss estimator to scale a magnitude of the binary value received from the cumulative loss estimator by an amount proportionate to "n" to obtain a scaled electrical distance estimate for the wireline. Corresponding method and means are disclosed.

20 Claims, 3 Drawing Sheets

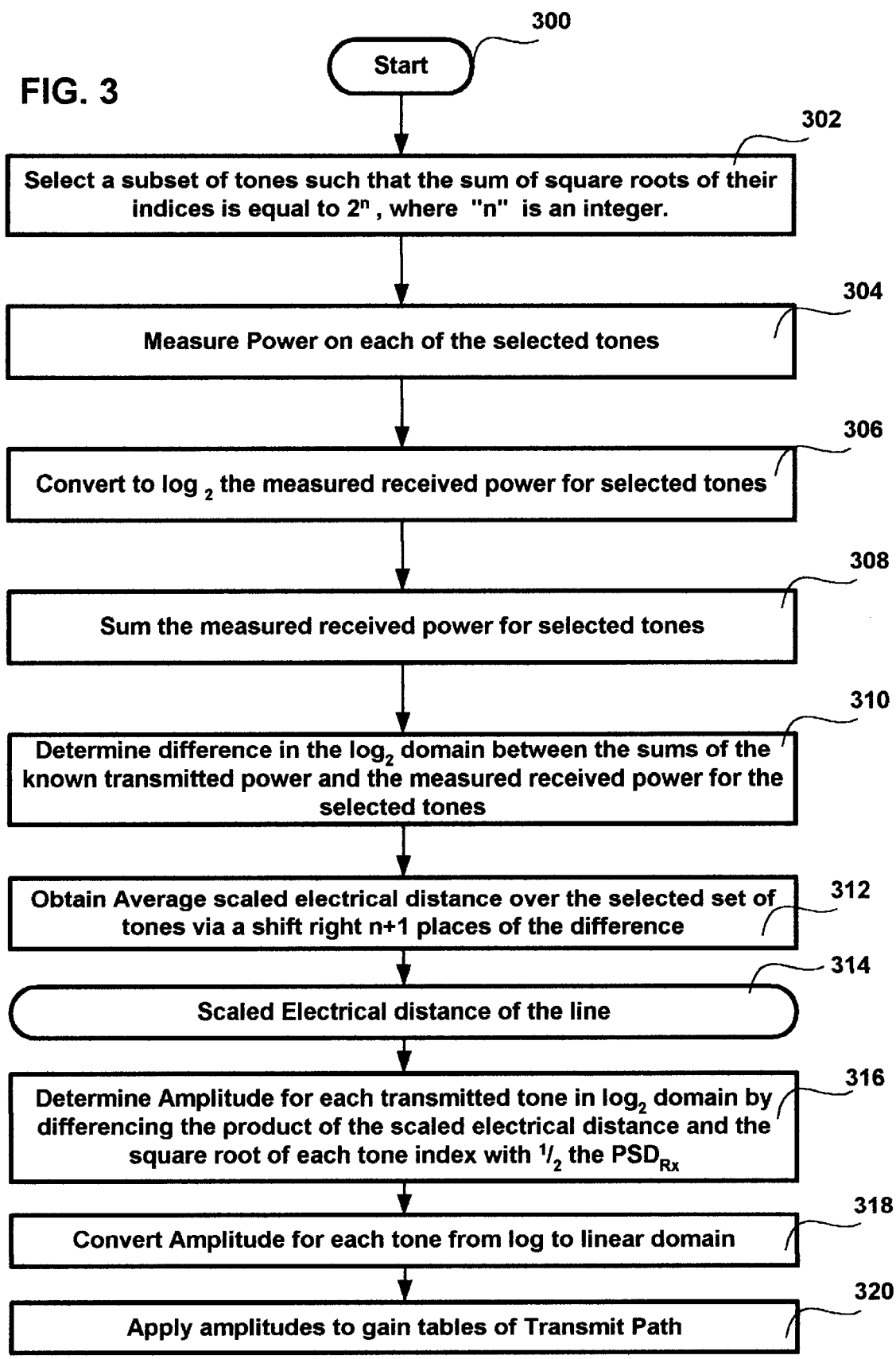

METHOD AND APPARATUS FOR WIRELINE CHARACTERIZATION

CROSS REFERENCE TO RELATED APPLICATION

This application is a continuation-in-part of prior filed U.S. Utility application Ser. No. 09/876,195 filed on Jun. 6, 2001, U.S. Pat. No. 6,516,049 entitled "Method and Apparatus for Insertion Loss Estimation in Wireline" which claims the benefit of prior filed now abandoned Provisional Applications No. 60/209,943 filed on Jun. 6, 2000 entitled "frequency Dependent Power Backoff" and No. 60/261,715 filed on Jan. 13, 2001 entitled "Upstream Power Backoff for VDSL" all of which are incorporated herein by reference in their entirety as if fully set forth herein. The present application claims the benefit of prior filed now abandoned Provisional Application No. 60/261,715 filed on Jan. 13, 2001 entitled "Upstream Power Backoff for VDSL".

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections to high speed back bone networks developed by telecommunications companies. An X-DSL modem operates at frequencies higher than the voice band frequencies, thus an X-DSL modem may operate simultaneously with a voice band modem or a telephone conversation. Currently there are over ten discrete XDSL standards, including: G.Lite, ADSL, VDSL, SDSL, MDSL, RADSL, HDSL, etc. Within each standard there are at least two possible line codes, or modulation protocols, discrete multitone (DMT) and carrier less AM/PM (CAP).

Each new XDSL protocol raises the bandwidth requirements of subscriber lines. As the bandwidth requirements increase so too does the complexity of the modem components. Additionally, because of the enormous variation in loop loss in the individual subscriber lines to which the modem may be coupled the individual components of the modem transmit and receive path must be reconfigurable to match the available bandwidth on a selected subscriber line. For modems which implement the VDSL protocol for example, the length and quality of the subscriber line will determine whether all or a portion of the two upstream and two downstream communications ranges will be available. The sheer length of the line results in significant attenuation of the upper communication ranges rendering their use impractical. Even on shorter loops the presence of bridges and taps can also constrain bandwidth. In each instance it is critical during the line qualification phase to be able to inexpensively and quickly determine insertion power loss into the subscriber line to which the modem is coupled.

What is needed is a modem with improved capabilities for determining insertion loss into a subscriber line.

SUMMARY OF THE INVENTION

The current invention provides a method and apparatus for characterizing a wireline. This includes determination of electrical distance, insertion loss, and gain scaling. The apparatus may be incorporated into physical or logical modems. The method may be implemented with any modulation protocol but is particularly suited for multi-carrier modulation protocols such as discrete multi-tone (DMT).

In an embodiment of the invention an apparatus for wireline characterization in a modem with a transmit path and a receive path each configured to couple with a remote modem via a wireline in which available communication bandwidth is split into a number of independent sub-channels is disclosed. The apparatus comprises: a tone selector, a cumulative loss estimator and a shift register. The tone selector selects a subset of the number of sub-channels within the bandwidth of a received wireline communication for which subset the sum of the square roots of the corresponding sub-channel indices may be expressed as an integer power "n" of 2. The cumulative loss estimator cumulates the insertion losses across the selected subset of the sub-channels and outputs a binary value corresponding thereto. The shift register couples to the cumulative loss estimator to scale a magnitude of the binary value received from the cumulative loss estimator by an amount proportionate to "n" to obtain a scaled electrical distance estimate for the wireline.

In an alternate embodiment of the invention a method for wireline characterization is disclosed. The method comprises:

selecting a subset of the number of sub-channels within the bandwidth of a received wireline communication for which subset the sum of the square roots of the corresponding sub-channel indices may be expressed as an integer power "n" of 2;

cumulating the insertion losses across the selected subset of the sub-channels and outputting a binary value corresponding thereto; and scaling a magnitude of the binary value cumulated in said act of cumulating by an amount proportionate to "n" to obtain a scaled electrical distance estimate for the wireline.

A corresponding means is also disclosed.

BRIEF DESCRIPTION OF THE DRAWINGS

These and other features and advantages of the present invention will become more apparent to those skilled in the art from the following detailed description in conjunction with the appended drawings in which:

FIG. 3 is a process flow diagram showing the processes associated with wireline characterization.

DETAILED DESCRIPTION OF THE EMBODIMENTS

Figure 1:
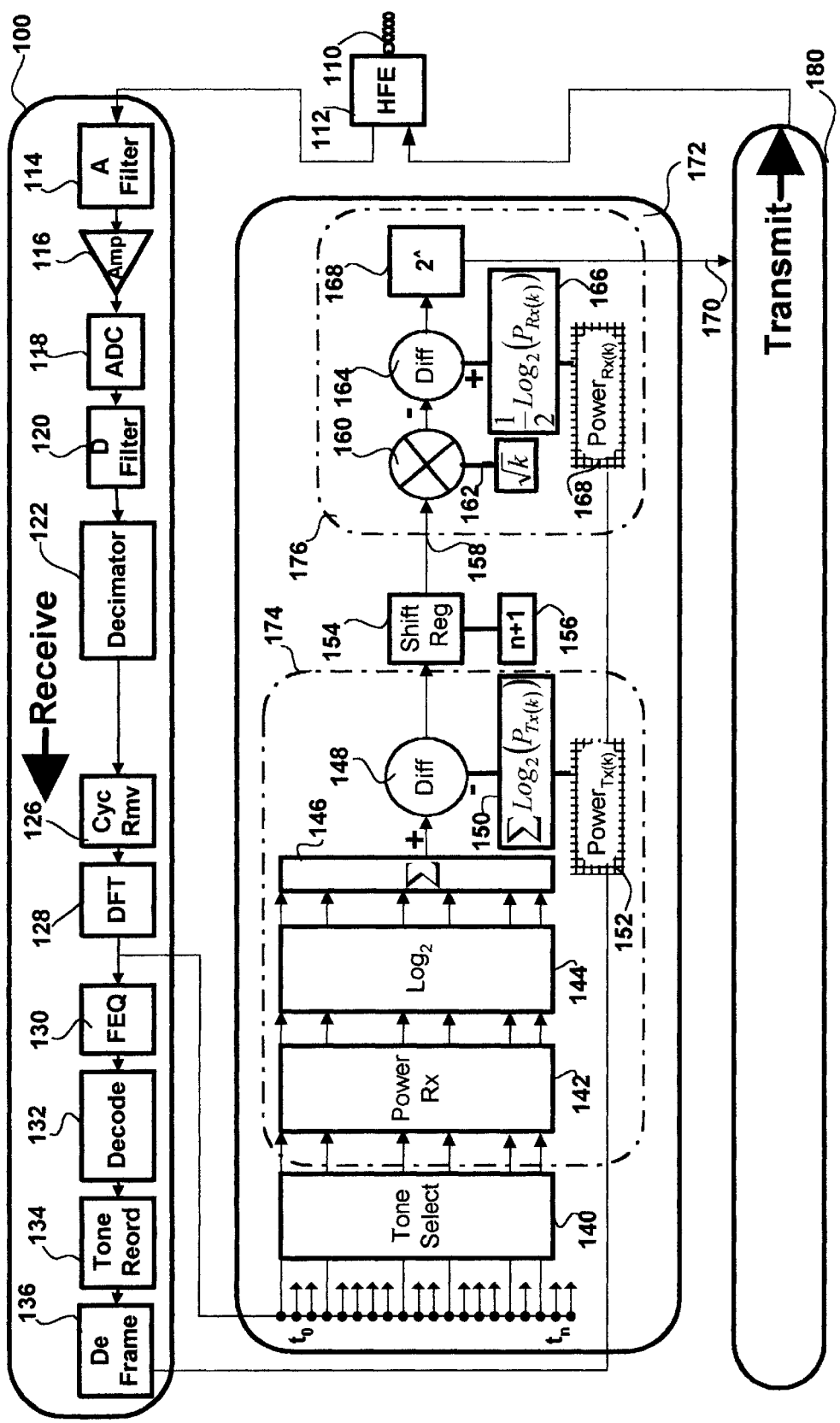
FIG. 1 is a hardware block diagram showing a receive path of a physical XDSL modem incorporating components for wireline characterization.

A method and apparatus for wireline characterization for XDSL communications is disclosed. During initialization of communications across a digital subscriber line each of the pair of modems will seek to determine the required signal amplitude and power to be applied within each frequency range associated with each DMT tone. An upper limit to the power applied to the signal within each tone bin is specified by the various XDSL standards. The corresponding upper limit is designed to minimize cross talk between the various subscriber lines within a bundle. The upper limit of power across the communication spectrum is set by the corresponding XDSL standard and the lower limit by the signal-to-noise ratio at which each modem can operate. The amount of power that needs to be applied to each tone bin will be determined by the signal loss within each tone bin across the subscriber line. To determine signal loss the transmitting modem will include in its initialization procedures transmit power parameters by which the receiving modem may determine the transmitted power within each tone bin. The power parameters may include individual power levels within each tone bin or the coefficients of a more general function describing applied power as a function of bin number or frequency. The receiving modem then measures the power of the received signal and compares this with the known transmit power to determine the transmit power loss within each tone bin. A loss determination can be used to qualify a line for a given XDSL protocol. In the case of XDSL protocols such as VDSL which include interlaced pairs of upstream and downstream frequency ranges, the loss determination may result in a determination that one of the frequency ranges has unacceptable losses therefore precluding its use for communications.

Typically subscriber lines are strung in parallel in a bundle between the central office and corresponding subscriber homes or businesses. There is cross talk between subscriber lines, and the cross-talk increases in proportion to the power level within each line. For this type of environment the power levels on each subscriber line need to be trimmed toward lower signal-to-noise ratios so as to minimize interference between lines. One way of achieving this result is for the transmitting modem to send to the receiving modem not only the above discussed transmit power parameters specifying the transmit power levels, but also a desired set of receive power parameters specifying the power levels or power spectral density ($PSDR_{Rx}$) which that modem needs to see on the signals it receives.

"Power back off" refers to the iterative process by which all the modem pairs in a binder of subscriber lines successively renegotiate the power levels down to acceptable minimums on each subscriber line. Three or more iterations may be required until an acceptable equilibrium is reached. The process may need to be reinitiated when a modem pair in the bundle is turned on or off, or when signal to noise ratios change due to outside interference. Because of the iterative nature of the process, and the need to repeat it from time to time, a premium is placed on the speed at which the power back off negotiations can be carried out. The current invention addresses that need by providing a method and apparatus which speeds the determination of line loss and from it the determination of power back off.

FIG. 1 is a block diagram showing the various logical modules associated with an XDSL modem implemented in accordance with the current invention. The local modem includes a receive path 100 and transmit path 180 coupled via a hybrid front end (HFE) 112 to a subscriber line 110, and also logic 172 for wireline characterization. The subscriber line 110 couples the local modem with a remote modem. The receive path includes: analog filter 114, line amplifier 116, analog-to-digital converter (ADC) 118, digital filter 120, decimator 122, cyclic prefix remover 126, discrete Fourier transform engine (DFT) 128, frequency domain equalizer 130, decoder 132, tone re-orderer 134 and deframer 136.

The logic 172 for line characterization is shown as discrete logic modules. This logic may also be implemented in any combination of hardware, software or firmware. The logic accepts input from the DFT engine in the form of successive symbol sets comprising the complex numbers each associated with a corresponding one of the tones/sub-carriers associated with the corresponding XDSL protocol. The logic includes the following modules: a tone selector 140, a cumulative loss estimator 174, a shift register 154 and a gain scaler 176. The cumulative loss estimator includes: a power estimator 142, a $\log_2$ estimator 144, a summer 146 and a difference 148. The difference 148 is coupled via a summer 150 to transmit power parameters 152 received across subscriber line 110 from a remote modem (not shown). The shift register is coupled to the shifter 156. The gain scaler includes: a multiplier 160, a difference 164 and a linearizer 168. The multiplier 160 couples to a sequencer 162. The difference 164 is coupled via a sequencer 166 to receive power parameters $PSD_R$) supplied by the remote modem.

The tone selector selects a specific subset of tones from one or more symbol sets supplied by the DFT. The cumulative loss estimator receives and stores during initialization a set of transmit power parameters from the remote modem and determines in the log domain the cumulative difference between the received power for the selected subset of tones and the power level at which they were transmitted by the remote modem. The shift register scales the magnitude of the difference by an amount proportionate to the sum of the square roots of the tone indexes to obtain a scaled electrical distance estimate for the subscriber line 110. The gain scaler uses the scaled electrical distance of the subscriber line 110 and receive power parameters from the opposing modem to determine the gain scaling for each tone in each symbol set transmitted by the local modem to the remote modem.

In this embodiment of the invention the logic for line characterization 172 is configured to provide as an intermediate output the scaled electrical distance of the wireline from which the insertion loss for any given tone can be estimated. Insertion loss is expressed in the following Equation 1:

$$Loss(f) = \frac{P_{Rx(f)}}{P_{Tx(f)}} = |e^{-d\alpha\sqrt{f}}|^2 \qquad \text{Equation 1:}$$

where the received power $P_{Rx}$ is expressed as a function of the transmitted power $P_{Tx}$ and the insertion loss in the line and where d is the equivalent electrical distance of the subscriber line between transmitter and receiver, f is the frequency of observation, and α? is a constant that is a function of type of wire used.

In an alternate embodiment of the invention the method and apparatus disclosed in this and the following figures and accompanying text can be configured to handle other functions which model insertion loss such as that shown in the following Equation 2:

$$Loss(f) = |e^{-d(\alpha\sqrt{f}+\epsilon f)}|^2 \qquad \text{Equation 2:}$$

where ε is another constant determined by the wire type.

Assuming that measurements are done on equally spaced grids in frequency domain, the frequency f can be expressed as f=k×Δf. By expressing the electrical distance d as $\hat{d}=d\alpha\sqrt{\Delta f}$ Equation 1 can be simplified into Equation 3:

$$Loss(k) = \frac{P_{Rx(f)}}{P_{Tx(f)}} = |e^{-\hat{d}\sqrt{k}}|^2 \qquad \text{Equation 3:}$$

where k is the tone index and $\hat{d}$ is the electrical length estimator.

By estimating the value for electrical length $\hat{d}$ the insertion loss of the line for any selected tone or sub-channel can be characterized.

To simplify the determination of electrical distance a subset of the tones are selected for processing. The subset must be large enough to avoid variations in insertion loss between selected tones. These variations may result from line taps, cross-talk, or external interference. Proper selection of tones is accomplished by the tone selector 140 which accepts input from the DFT engine 128. This input from the DFT engine comprises complex numbers each associated with a corresponding one of the tones/sub-carriers of one symbol set or a sequence of symbol sets associated with a corresponding XDSL protocol.

The tone selector selects a subset of tones from one or more of the XDSL symbol sets which the DFT engine 128 has converted from the time domain to the frequency domain. The tone indexes k are chosen in a manner which simplifies the determination of electrical distance for the wireline. Tone indexes are selected which are distributed across the bandwidth of interest in a manner which satisfies the following Equation 4;

$$Tone\ Indexes(k) \equiv \sum_{i=1}^{M} \sqrt{k_i} = 2^n \qquad \text{Equation 4:}$$

where $k_i$ is index of the $i^{th}$ tone in a tone set of M tones. A subset of the M tones within a symbol set is chosen for which the sum of the square root of the corresponding indices may be expressed as an integer power "n" of 2.

A qualifying exemplary set of selected sub-channels or tones for an XDSL protocol which specified M=128 tones in each symbol set would be tones with indices k: 4,9,16,25, 64,100. The selected subset of sub-channels or tones have indices with integer square root values: 2,3,4,5,8,10 respectively. The sum of the square roots of the indices associated with the selected tones equals 32. The selected set of tones satisfies Equation 4 since 32 can be expressed as $2^5$ where n=5. The selection of tones in this manner allows simplifications in the logic required to solve for electrical distance, specifically the division operation that would otherwise be required to determine an average value for the electrical distance associated with the transmission of the selected subset of tones.

The complex numbers expressed in binary form, associated with each of the selected subset of tones are provided by the tone selector 140 to the cumulative loss estimator and specifically to the power estimator 142 potion thereof The cumulative loss estimator determines the difference in the log domain between the sum of the power of the selected subset of received tones and the corresponding sum for the power levels at which each was transmitted. Processing begins in the power estimator with a determination of the power for each tone in the subset, as expressed in the following Equation 5.

$$P_{Rx(k)} = r_k^2 + i_k^2 \qquad \text{Equation 5:}$$

where r and i are the real and imaginary parts of the amplitude of the received signal within each of the selected tone bins "k" of the subset K of selected tones or sub-channels from within the set of M tones or sub-channels supplied within each symbol set by the DFT engine 128. Where average rather than instantaneous power levels of each selected sub-channels is desired, the selected sub-channels from successive symbol sets will be evaluated.

Next in the $\log_2$ estimator 144 the instantaneous or average power for each tone bin is converted to $\log_2$. The log estimator may in an embodiment of the invention be configured to generate an approximate log conversion, to one degree of precision. In this embodiment the $\log_2 (100_2)$ or $\log_2 4$ would be 2 while the $\log_2 (110_2)$ or $\log_2 6$ would be 3 with the next most significant bit determining whether a roundup occurs. The log estimator supplies the corresponding average or instantaneous power levels for the selected subset of tones to the summer 146 where they are summed to yield the log of the instantaneous or average received power for all of the sampled subset of tone bins. The purpose of this step is to mitigate the effect of noise and bridge tabs in the estimation process. The sum is effectively equivalent to averaging operation across measured frequency bins. The log sum of the total power difference for the sampled tones is provided at the positive input of difference 148.

The following Equations 6A–B, express in the log domain the insertion loss as for a single tone with associated index k as defined in Equation 3 above and for the sum of the subset of selected tones, respectively.

$$\log_2(P_{Rx(k)}) - \log_2(P_{Tx(k)}) = -2(\log_2 e)(\hat{d}\sqrt{k}) \qquad \text{Equation 6A:}$$

$$\underbrace{\sum_{i=0}^{M} \text{Log}_2(P_{Rx(k_i)})}_{1} - \underbrace{\sum_{i=0}^{M} \text{Log}_2(P_{Tx(k_i)})}_{2} = \qquad \text{Equation 6B:}$$

$$\underbrace{\sum_{i=0}^{M} -2(\text{Log}_2(e))(\hat{d}\sqrt{k_i})}_{3}$$

The summer 146 provides to the positive input of the difference 148 the sum of the instantaneous/average received power for all the selected tones as expressed in the first term of Equation 6B. The input of instantaneous/average transmitted power is provided to the negative input of the difference by the summer 150. That summer 150 takes the transmit power parameters 152 supplied to it by the remote modem (not shown) during this setup phase and in the $\log_2$ domain sums the transmit power parameters for the selected subset of tones. The resultant transmit power log sum as expressed in the second part of Equation 6B is provided to the negative input of the difference 148. The difference provides the difference between the two inputs at its output which corresponds with the third part of Equation 6B.

Determining the electrical distance $\hat{d} = d\alpha\sqrt{\Delta f}$ portion of the third part of Equation 6B requires a division operation by two times the sum of the square roots of the indices k for the selected subset of tones. The complexity of the division operation is avoided by means of the properties of the selected subset of tones sampled by the tone selector. Those tones were chosen such that the sum of the square of the indices corresponds with an integer power of 2. Since all calculations in the logic are performed in binary a simple shift operation is all that is required to perform on the output of the difference in order to appropriately scale the magnitude of the difference value. The shift right operation is performed by shift register 154 with the number of places for the shift determined by the value in shifter 156. The number of places for the shift is n+1 with the n corresponding to the power of two to which the sum of the square roots of the selected tones indices corresponds. The resultant scaled electrical distance is output on line 158 and corresponds with the electrical distance $\hat{d}$ multiplied by a constant, i.e. $-\log_2 e$ or approximately −1.44.

The following Equations 7 express the above discussed operations for the set of tones discussed above, i.e. k=4,9, 16,25,64,100.

$$\log_2(P_{Rx(4)}) - \log_2(P_{Tx(4)}) = 2(\log_2 e)(-\hat{d}\sqrt{4})$$
$$\log_2(P_{Rx(9)}) - \log_2(P_{Tx(9)}) = 2(\log_2 e)(-\hat{d}\sqrt{9})$$
$$\log_2(P_{Rx(16)}) - \log_2(P_{Tx(16)}) = 2(\log_2 e)(-\hat{d}\sqrt{16})$$
$$\log_2(P_{Rx(25)}) - \log_2(P_{Tx(25)}) = 2(\log_2 e)(-\hat{d}\sqrt{25})$$
$$\log_2(P_{Rx(64)}) - \log_2(P_{Tx(64)}) = 2(\log_2 e)(-\hat{d}\sqrt{64})$$
$$\log_2(P_{Rx(100)}) - \log_2(P_{Tx(100)}) = 2(\log_2 e)(-\hat{d}\sqrt{100})$$
$$\underbrace{\sum_{i=0}^{M}\log_2(P_{Rx(k_i)}) - \sum_{i=0}^{M}\log_2(P_{Tx(k_i)})}_{\text{known a priori}} = -2(\log_2 e)(32)\hat{d}$$

Equation 7:

To solve for scaled electrical distance, e.g. $-\hat{d}\log_2 e$, it is necessary to divide the difference of the sums on the left in Equation 7 by 2*32. Since the term on the left is expressed in binary and since the sum of the square roots of the tone indices corresponds with an integer power of two, a division by 64, i.e. $2^{5+1}$, can be accomplished by a simple shift right by 6 places. This shift operation converts the log sum difference of the insertion loss and converts it to a average scaled electrical distance from which insertion loss for any tone bin can be determined.

A more general description of this operation is shown in the following Equation 8:

$$-\hat{d}\underbrace{\log_2 e}_{1.44} = \frac{\sum_{i=0}^{M-1}\log_2(P_{Rx(k_i)}) - \sum_{i=0}^{M-1}\log_2(P_{Tx(k_i)})}{2^{n+1}}$$

Equation 8:

The division is easily avoided and replaced with a shift right operation by n+1 since the term in the denominator corresponding with the sum of the square roots of the indices of the selected tones corresponds with 2 to the power of n+1. The resultant which corresponds with electrical distance, i.e. electrical distance times a constant, may be used to qualify a line or a frequency range for communication. The shift operation may in alternate embodiments of the invention be by n rather than n+1 with the result that the scale factor for the electrical distance increases by a factor of 2.

Where power back off is implemented, succeeding stages 160–168 of the device are utilized to determine the transmit power for each tone on the transmit path. The power levels are chosen so that the opposing modem on the other end of the subscriber line receives communications which, after line loss, correspond with the requested receive power levels across the entire tone set of each symbol sequence. These receive power parameters are also obtained by demodulation during initialization of communications from the remote modem. These receive power parameters or power spectral densities (PSD) for each channel transmitted by the modem are stored in table 168. The relationship between the PSD required by the remote modem and the power at which the local modem must transmit each tone in order to meet those requirements is set forth in the following Equation 9:

$$P_{Tx(k)} = \frac{PSDR_{Rx(k)}}{Loss(k)}$$

Equation 9:

in which PSDRx(k) corresponds with the receive power parameters obtained from the opposing modem The variable k at this point corresponds once again to tone or sub-channel indices except that in this case the tones or sub-channels on the transmit path will have different indices than on the receive path. Nevertheless the electrical distance parameters calculated for communications received by the modem will also be applied to communications transmitted by the modem. Equation 10 expresses in the $\log_2$ domain the relationship set forth in Equation 9.

$$\log_2(P_{Tx(k)}) = \log_2(PSDR_{Rx(k)}) - \overline{\log_2(Loss(k))}^{-2\hat{d}\log_2 e\sqrt{k}}$$

Equation 10:

$PSDR_{Rx(k)}$ is the desired power spectral density at the receiver of the remote modem for tone k and the loss(k). The amplitude required to achieve the transmit power is defined by the square roots of the power, however, the square root in the log domain is equivalent to division by two operation, therefore the log base 2 of the required amplitude is defined as set forth in the following Equation 11

$$\underbrace{\log_2(A_{Tx(k)})}_{1} = \underbrace{\frac{1}{2}\log_2(PSDR_{Rx(k)})}_{2} - \underbrace{\left(-\hat{d}\log_2 e\sqrt{k}\right)}_{3}$$

Equation 11:

The gain scaler 176 determines for each of the transmitted tones in each symbol set the required amplitude or gain factor in order to comply with the PSD levels requested by the remote modem (not shown). Within the gain scaler, each of the $3^{rd}$ terms of the Equation 11 is supplied by the multiplier 160 which obtains for each tone or sub-channel transmitted by the modem the corresponding square root of the tone index from sequencer 162 and multiplies that by the scaled electrical distance on the output 158 from the shift register 154. Next in the difference takes each loss value for each tone supplied by the multiplier 160 and differences it with half the corresponding log value for the corresponding receive power parameter or PSD provided at its positive input from the receive power table via sequencer 166. The resultant sequence of transmit amplitude parameters is provided as an input to linearizer 168. The linearizer converts from log domain back to the linear domain the required amplitude for each tone or sub-channel transmitted by the modem. The resultant gain factors are supplied via signal line 170 to the gain table portion (not shown) of the transmit path 180. These gains are applied to each corresponding sub-channel or tone in the transmit direction.

The line characterization logic 172 as described above may be applied with equal advantage in physical modems such as that shown in FIG. 1, or in logical modems such as will be described and discussed in the following FIG. 2 and accompanying text. The receive and transmit path components may be coupled to one another either by packet based transfer of successive packetized portions of a communication channel or by dedicated point-to-point coupling between components.

Figure 2:
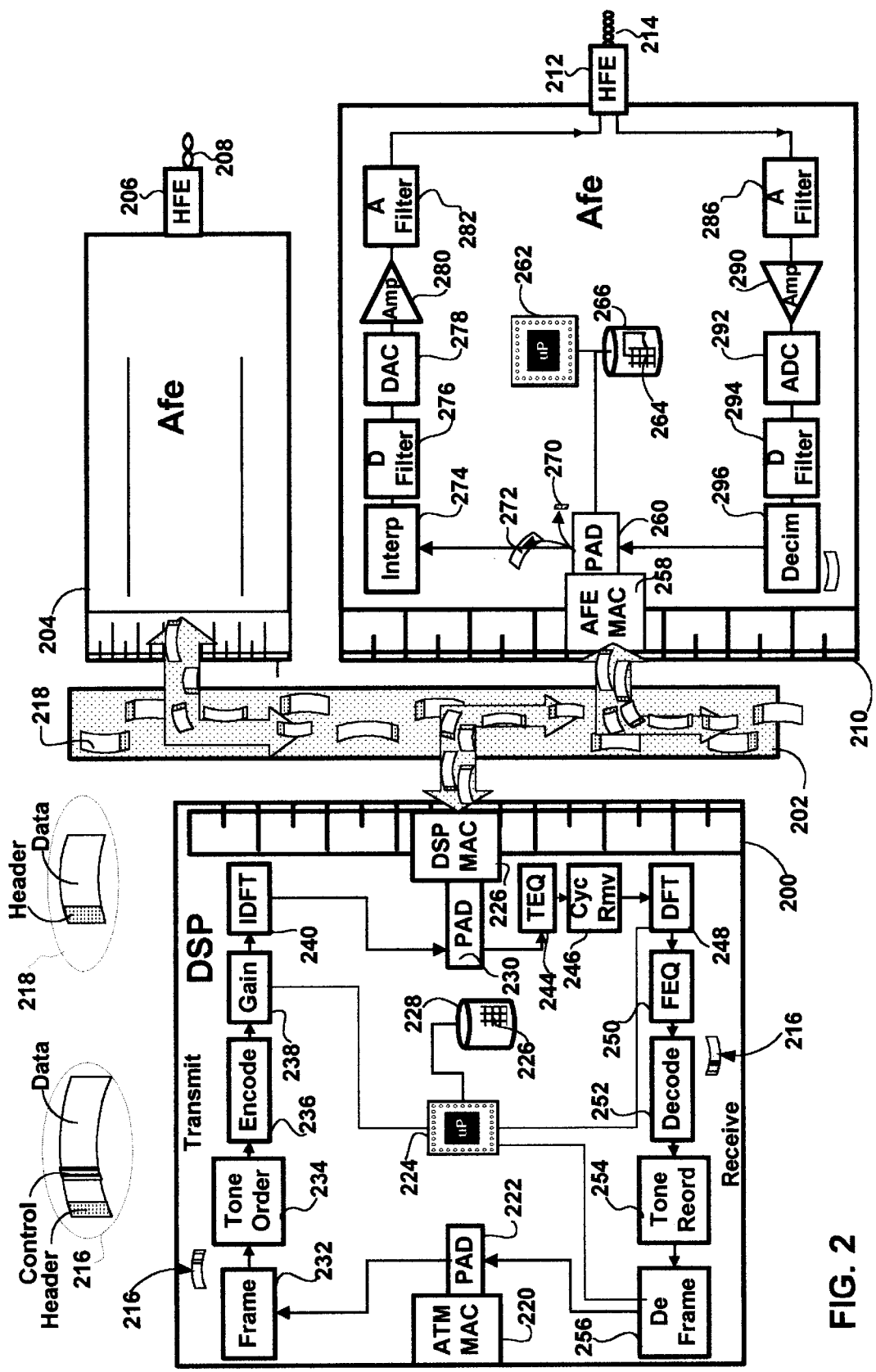
FIG. 2 is a detailed hardware block diagram of a packet based multi-channel multi-protocol XDSL logical modem implementing wireline characterization.

FIG. 2 is a detailed hardware block diagram of a packet based multi-channel multi-protocol XDSL logical modem which may be used to implement the current invention. In this architecture a DSP 200 handles processing for a number of channels of upstream and downstream subscriber line communications via a number of analog front ends (AFE's) 204 and 210. Each AFE in turn accepts packets associated with one or more of subscriber lines to which each AFE is coupled. AFE 204 is shown coupled via HFE 206 with subscriber line 208. AFE 210 is shown coupled via HFE 212 with subscriber line 214. The logical modem shown in FIG. 2 supports packet based processing of data between a DSP and AFE as well as within each DSP and AFE. Packet processing between DSP and AFE modules involves transfer over bus 202 of bus packets 218 each with a header and data portion. The header contains information correlating the data with a specific channel and direction, e.g. upstream or downstream, of communication. The data portion contains for upstream traffic digitized samples of the received data for each channel and for downstream packets digitized symbols for the data to be transmitted on each channel.

Packet processing within a DSP may involve device packets 216. The device packets may include a header, a control portion and a data portion. The header serves to identify the specific channel and direction. The header may contain control information for the channel to be processed. The control portion may also contain control parameters for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line. These modules, AFE and DSP, may be found on a single universal line card or may alternately be displaced from one another on separate line cards linked by a DSP bus. In still another embodiment they may be found displaced across an ATM network.

The DSP 200 includes, a DSP medium access control (MAC) 226 which handles packet transfers to and from the DSP bus 202. The MAC couples with a packet assembler/disassembler (PAD) 230. For received DSP bus packets, the PAD handles removal of the DSP bus packet header and insertion of the device header and control header which is part of the device packet 216. The content of these headers is generated by the core processor 224 using statistics gathered by the de-framer 256. These statistics may include gain tables, or embedded operations channel communications from the subscriber side. The PAD embeds the required commands generated by the core processor in the header or control portions of the device packet header. Upstream device packets (Receive packets) labeled with the appropriate channel identifier are passed through the time domain equalizer (TEQ) 244 and the cyclic prefix/suffix remover 246 to the discrete Fourier transform engine 248. The DMT engine fetches packets and processes the data in them in a manner appropriate for the protocol, channel and command instructions, if any, indicated by the header. The processed data is then passed to the frequency domain equalizer (FEQ) 250, the decoder 252, the tone reorderer 254 and the deframer 256. Each module reads the next device packet and processes the data in it in accordance with the instructions or parameters in its header. The processed de-framed data is passed to the ATM pad 222 for wrapping with an ATM header and removal of the device header. The ATM MAC 220 then places the data with an ATM packet on the ATM network.

Control of the receive modules, e.g. DFT engine 248, FEQ 250, etc. is implemented as follows. The core processor 224 gathers statistical information on each channel transmit power parameters, receive power parameters and gain tables corresponding thereto. Gain table change requests from the subscriber as well as instructions in the embedded operations portion of the channel may also be gathered. Those tables 226 are stored by the core processor in memory 228. When a change in gain table for a particular channel is called for the core processor sends instructions regarding the change in the header of the device packet for that channel via PAD 230 and writes the new gain table to a memory which can be accessed by the appropriate module in the receive path. This technique of in band signaling with packet headers allows independent scheduling of actions on a channel by channel basis in a manner which does not require the direct control of the core processor. Instead each module in the receive path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different XDSL protocols, e.g. a packet with ADSL sample data followed by a packet with VDSL sampled data For example as successive packets from channels implementing G.Lite, ADSL and VDSL pass through the DFT 248 the number of tones will vary from G.lite, ADSL and for VDSL. The framer 232 and de-framer 256 will use protocol specific information associated with each of these channels to look for different frame and super frame boundaries. The measured level of each tone is maintained by processor 224 in memory 228. This same memory may be utilized for calculating the electrical distance associated with each subscriber line and from it the proper amplitude or gain factor to be applied to each tone in to meet the $PSD_{Rx}$ requirements of the remote modem.

On the downstream side (Transmit path) the same architecture applies. ATM data is wrapped by PAD 222 with a device header the contents of which are again dictated by the core processor 224. That processor embeds control information related to each channel in the packets corresponding to that channel. The Framer 232, tone orderer 234, encoder 236, gain scaler 238 and inverse discrete Fourier transform (IDFT) engine 240 process these packets according to the information contained in their header or control portions of each device packet. From the IDFT 240 each updated device packet with a digitized symbol(s) for a corresponding channel is sent to PAD 230 where the device header is removed. The DSP PAD places the DSP packet 218 with an appropriate header to DSP MAC 226 for placement onto the DSP bus 202 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet on the bus 202 directed to AFE 210 is detected by AFE MAC 258 on the basis of information contained in the packet header. The packet is passed to PAD 260 which removes the header 270 and sends it to the core processor 262. The packet's header information including channel ID is stored in the core processor's memory 266. The information is contained in a table 264. The raw data 272 is passed to interpolator 274. On the transmit path, the interpolator 274 reads a fixed amount of data from each channel. The amount of data read varies for each channel depending on the bandwidth of the channel. The amount of data read during each bus interval is governed by entries in the control table for each channel which is established during channel setup and is stored in memory 266. The interpolator up samples the data and passes it to low pass filters 276 to reduce the noise introduced by the DSP. Implementing interpolation in the AFE as opposed to the DSP has the advantage of lowering the bandwidth requirements of the DSP bus 202. From the interpolator data is passed to the digital-to-analog converter (DAC) 278. The DAC converts the digitized symbol for each of the input signals on each of the input signal lines/channels to corresponding analog signals. These analog signals are introduced to the amplification stage 280, from which they are passed to analog filter 282 and then via an associated HFE, e.g. HFE 212 to a corresponding subscriber line e.g. subscriber line 214.

On the upstream path, the receive path, individual subscriber lines couple to the receive path. Subscriber line 214 couples through HFE 212 to the analog filer 286. The analog filter provides input to the corresponding line amplifier 290. From the line amplifier the received analog data is digitized in the analog to digital converter (ADC) 292. The digitized output is passed through the digital filter 294 and decimator 296 to the pad 260. The PAD wraps the raw data in a DSP header with channel ID and other information which allows the receiving DSP to properly process it. From the PAD it is passed to the AFE MAC 258 for wrapping in a bus packet 218 and delivery to the DSP 200.

During initialization the transmit power parameters and receive power parameters are passed from the deframer 256 to the processor 224. The complex coefficients the tones selected by the processor 224 are processed by the processor in the $\log_2$ domain steps set forth in FIG. 1 and the resultant gain values are placed in the appropriate gain tables for each channel in memory 228 and applied to corresponding channels via the gain scaler 238 to each symbol set processed by the IDFT 240.

FIG. 3 is a process flow diagram showing the processes associated with characterizing a wireline. After startup 300, selection of the qualifying subset of tones is accomplished by the tone selector. This selection may be made "on the fly" in dependence on the XDSL protocol and the number of supported tones within that protocol. It may also be made from a lookup table which specifies for all supported XDSL protocols the selected subset of tones. Next in process 304 the power for the selected set of tones is determined, in the power estimator 142 (See FIG. 1). The power calculation will be performed for the selected subset of tones with qualifying indices and may be from either a single sample from a single symbol set or from an average of successive samples. Then in process 306 the $\log_2$ of the measured received power is obtained in the log estimator 144 (See FIG. 1). Next, in process 308 the sum of the logs of the measured received power is obtained in the summer 146 (See FIG. 1). Then in process 310 the difference in the log domain between the sums of the known transmitted and received power for the selected tones obtained by the difference 148 shown in FIG. 1. This average difference is then obtained in process 312. A simple shift right operation of n+1 places by the shift register 154 (See FIG. 1) accomplishes this result, where n is the power of 2 which corresponds with square root of the sums of the selected subset of tones. In process 314 the resultant scaled electrical distance, i.e. $-\hat{d}\log_2 e$ or approximately $-1.44 \hat{d}$ is obtained. This value can be used to qualify a subscriber line for XDSL communications or to qualify a frequency range within a given XDSL protocol such as VDSL. Where power back off is implemented the calculated scaled electrical distance must be combined with the desired PSD on the opposing modem to determine the amplitudes for all tones transmitted on the transmit path 180.

Calculation of amplitudes for each tone in $\log_2$ domain is accomplished in process 316. First the scaled electrical distance is multiplied by the square root of each tone in a symbol set. This is accomplished by the multiplier 160 shown in FIG. 1. The difference between each product output by the multiplier and half the corresponding received PSD is then obtained via the difference 164 shown in FIG. 1. Then in process 318 the amplitudes for each tone within a complete tone set are converted back from the log domain in the linearizer 168. The linearizer converts each log amplitude to a normal number by raising 2 to a power corresponding to each log amplitude. The resultant amplitudes may then be applied to the gain tables 238 on the transmit path (See FIG. 2).

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for wireline characterization in a modem with a transmit path and a receive path each configured to couple with a remote modem via a wireline in which available communication bandwidth is split into a number of independent sub-channels, and the apparatus comprising:

a tone selector for selecting a subset of the number of sub-channels within the bandwidth of a received wireline communication for which subset the sum of the square roots of the corresponding sub-channel indices corresponds with an integer power "n" of 2;

a cumulative loss estimator for cumulating the insertion losses across the selected subset of the sub-channels and for outputting a binary value corresponding thereto; and a shift register coupled to the cumulative loss estimator to scale a magnitude of the binary value received from the cumulative loss estimator by an amount proportionate to "n" to obtain a scaled electrical distance estimate for the wireline.

2. The apparatus of claim 1, further comprising:

a gain scaler coupled to the shift register and accepting as input there from the scaled electrical distance, and the gain scaler determining a gain factor for each of the communication sub-channels on the transmit path based on the scaled electrical distance received from the shift register and on receive power parameters received from the remote modem.

3. The apparatus of claim 1, wherein indices of qualifying sub-channels selected by the tone selector satisfy the following relationship:

$$\sum_{i=1}^{M} \sqrt{k_i} = 2^n$$

where $k_i$ is index of the $i^{th}$ sub-channel in a set of M sub-channels.

4. The apparatus of claim 1, wherein the cumulative loss estimator further comprises:

a power estimator which determines one of the instantaneous and the average power for each of the selected subset of sub-channels;

a $\log_2$ estimator to determine the log value of the corresponding one of the instantaneous or average power for each selected sub-channel as supplied by the power converter;

a summer for summing the logs of the received power for each selected sub-channel as supplied by the $\log_2$ estimator; and a difference for differencing in the log domain the sum of the logs of the received power and the transmitted power for each of the selected sub-channels.

5. The apparatus of claim 1, wherein the shift register scale the magnitude of the binary value by an amount corresponding with one of "n" and "n+1".

6. The apparatus of claim 4, wherein the transmitted power for each of the selected sub-channels is received from the remote modem.

7. The apparatus of claim 2, wherein the gain scaler further comprises:
   a multiplier coupled to the shift register to multiply the square root of the index of each of the sub-channels transmitted by the modem by the scaled electrical distance obtained from the shift register;
   a difference to determine in the log domain the required amplitude for transmission of each sub-channel by differencing in the log domain half the value of the received power for a corresponding sub-channel and the estimated loss for that sub-channel as output by the multiplier; and
   a linearizer to convert from log domain back to the linear domain the required amplitude for each sub-channel transmitted by the modem.

8. The apparatus of claim 1, wherein the independent sub-channels correspond with the tones of an XDSL communication protocol.

9. The apparatus of claim 1, wherein the modem comprises one of a physical modem and a logical modem.

10. A method for wireline characterization in a modem with a transmit path and a receive path each configured to couple with a remote modem via a wireline in which available communication bandwidth is split into a number of independent sub-channels, and the method comprising:
    selecting a subset of the number of sub-channels within the bandwidth of a received wireline communication for which subset the sum of the square roots of the corresponding sub-channel indices corresponds with an integer power "n" of 2;
    cumulating the insertion losses across the selected subset of the sub-channels and outputting a binary value corresponding thereto; and
    scaling a magnitude of the binary value cumulated in said act of cumulating by an amount proportionate to "n" to obtain a scaled electrical distance estimate for the wireline.

11. The method of claim 10, further comprising:
    determining a gain factor for each of the communication sub-channels on the transmit path based on the scaled electrical distance received from the shift register and on receive power parameters received from the remote modem.

12. The method of claim 10, wherein indices of qualifying sub-channels selected by in said act of selecting satisfy the following relationship:

$$\sum_{i=1}^{M} \sqrt{k_i} = 2^n$$

where $k_i$ is index of the $i^{th}$ sub-channel in a set of M sub-channels.

13. The method of claim 10, wherein the cumulating act further comprises:

determining one of the instantaneous and the average power for each of the selected subset of sub-channels;

determining the log value of the corresponding one of the instantaneous or average power for each selected sub-channel;

summing the logs of the received power for each selected sub-channel; and differencing in the log domain the sum of the logs of the received power and the transmitted power for each of the selected sub-channels.

14. The method of claim 10, wherein the scaling in said scaling corresponds with one of "n" and "n+1".

15. The method of claim 13, wherein the differencing act further comprises:
    receiving transmit power parameters from the remote modem.

16. The method of claim 11, wherein the determining act further comprises:
    multiplying the square root of the index of each of the sub-channels transmitted by the modem by the scaled electrical distance obtained in said scaling act to produce an estimated loss for each sub-channel;
    differencing in the log domain half the value of the received power for a corresponding sub-channel and the estimated loss for that sub-channel to determine in the log domain the required amplitude for each corresponding sub-channel; and
    converting from log domain back to the linear domain the required amplitude for each sub-channel transmitted by the modem.

17. The method of claim 10, wherein the independent sub-channels correspond with the tones of an XDSL communication protocol.

18. The method of claim 10, wherein the modem comprises one of a physical modem and a logical modem.

19. A means for wireline characterization in a modem with a transmit path and a receive path each configured to couple with a remote modem via a wireline in which available communication bandwidth is split into a number of independent sub-channels, and the means comprising:
    means for selecting a subset of the number of sub-channels within the bandwidth of a received wireline communication for which subset the sum of the square roots of the corresponding sub-channel indices corresponds with an integer power "n" of 2;
    means for cumulating the insertion losses across the selected subset of the sub-channels and outputting a binary value corresponding thereto; and
    means for scaling a magnitude of the binary value cumulated by said means for cumulating by an amount proportionate to "n" to obtain a scaled electrical distance estimate for the wireline.

20. The means of claim 19, further comprising:
    means for determining a gain factor for each of the communication sub-channels on the transmit path based on the scaled electrical distance received from the means for scaling and on receive power parameters received from the remote modem.

* * * * *